US006821579B2

United States Patent
Yuzawa et al.

(10) Patent No.: US 6,821,579 B2
(45) Date of Patent: Nov. 23, 2004

(54) SURFACE TREATMENT METHOD USING ELECTRIC DISCHARGE, AND AN ELECTRODE FOR THE SURFACE TREATMENT METHOD

(75) Inventors: Takashi Yuzawa, Tokyo (JP); Akihiro Goto, Tokyo (JP); Toshio Moro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/822,025

(22) Filed: Mar. 30, 2001

(65) Prior Publication Data

US 2001/0014405 A1 Aug. 16, 2001

Related U.S. Application Data

(63) Continuation of application No. PCT/JP98/005106, filed on Nov. 13, 1998.

(51) Int. Cl.$^7$ .......................... H05H 1/48; H01T 14/00; B23H 1/06; B23H 9/00
(52) U.S. Cl. ............. 427/580; 204/192.38; 204/298.41; 219/69.15; 219/69.17
(58) Field of Search ................................ 427/580, 540; 204/192.38, 298.41; 219/69.1, 69.14, 69.15, 69.17, 69.2

(56) References Cited

U.S. PATENT DOCUMENTS

| | | | | |
|---|---|---|---|---|
| 4,193,852 A | * | 3/1980 | Inoue ........................... | 219/69 |
| 4,520,087 A | * | 5/1985 | Kamata et al. ............. | 429/219 |
| 4,735,678 A | * | 4/1988 | Mandigo et al. ............... | 219/69 |
| 4,797,527 A | * | 1/1989 | Yamamoto et al. | |
| 5,108,555 A | * | 4/1992 | Nishimuro et al. ......... | 427/123 |
| 5,231,270 A | * | 7/1993 | Groos et al. ............. | 219/69.12 |
| 5,304,288 A | * | 4/1994 | De Beurs et al. ........ | 219/69.17 |
| 5,637,239 A | * | 6/1997 | Adamski et al. ......... | 219/69.15 |
| 5,837,957 A | * | 11/1998 | Sato et al. ............... | 219/69.15 |
| 5,858,479 A | | 1/1999 | Saito et al. | |
| 6,311,576 B1 | * | 11/2001 | Pletschet ..................... | 74/441 |
| 6,314,778 B1 | * | 11/2001 | Moro et al. ..................... | 72/88 |
| 6,602,561 B1 | * | 8/2003 | Moro et al. ................. | 427/580 |
| 2002/0136613 A1 | * | 9/2002 | Tidwell ....................... | 409/201 |

FOREIGN PATENT DOCUMENTS

| | | | | |
|---|---|---|---|---|
| GB | 2069396 A | * | 8/1981 | ............. 219/69.12 |
| JP | SHO 51-97099 | | 8/1976 | |
| JP | SHO 54-104095 | | 8/1979 | |
| JP | SHO 55-48538 | | 4/1980 | |
| JP | SHO 56-15938 | | 2/1981 | |
| JP | 63-005956 | * | 1/1987 | |
| JP | 04033810 A | | 2/1992 | |
| JP | 404-261714 A | * | 9/1992 | ............. 219/69.12 |
| JP | 05148615 A | | 6/1993 | |
| JP | HEI 5-148615 | | 6/1993 | |
| JP | 405-285737 A | * | 11/1993 | ............. 219/69.17 |
| JP | 405-287335 A | * | 11/1993 | ............. 219/69.17 |
| JP | HEI 5-508684 | | 12/1993 | |
| JP | 40-6106420 A | * | 4/1994 | ............. 219/69.12 |
| JP | 06182626 A | | 7/1994 | |
| JP | HEI 6-182626 | | 7/1994 | |
| JP | HEI 8-300227 | | 11/1996 | |
| JP | HEI 9-19829 | | 1/1997 | |
| JP | HEI 9-192937 | | 7/1997 | |
| JP | HEI 11-000827 | | 1/1999 | |
| WO | WO 91-14799 | | 10/1991 | |

OTHER PUBLICATIONS

Translation of JP5–148,615 to Masao Saito et al, Jun. 1993.*
Translation of H6–182626 to Keiichi Urashiro et al, Jul. 1994.*
Translation JP 9–19829 by Masao Sato et al, Jan. 21, 1997.*

* cited by examiner

*Primary Examiner*—Marianne Padgett
(74) *Attorney, Agent, or Firm*—Sughrue Mion, PLLC

(57) ABSTRACT

A discharge electrode comprising a material having solid lubricant effect, such as molybdenum, is used to generate discharge in a pulse form between the discharge electrode and a workpiece, the surface of which is to be treated, in working liquid containing carbon components, such as water. Material consumed or melted from the discharge electrode, generated because of the electric discharge energy based on the pulse form discharge, gets adhered to and deposited onto a surface of the workpiece thereby forming a coat having lubricant effect on the surface of the workpiece.

3 Claims, 2 Drawing Sheets

SURFACE TREATMENT METHOD USING ELECTRIC DISCHARGE, AND AN ELECTRODE FOR THE SURFACE TREATMENT METHOD

This is a continuation application of PCT Patent Application PCT/JP98/05106, filed Nov. 13, 1998, which was published in Japanese.

TECHNICAL FIELD

The present invention in general relates to a surface treatment method using electric discharge, and an electrode for discharge surface treatment. More particularly, this invention relates to a technology of adhering and depositing, on the surface of a workpiece, an electrode consumed/melted material of a discharge electrode that is generated by discharge energy based on in-liquid discharge between the discharge electrode and a workpiece, thereby forming a coat of the material of the electrode on the surface. This invention also relates to an electrode for the surface treatment method using electric discharge.

BACKGROUND ART

The technique of adhering and depositing, on the surface of a workpiece, an electrode consumed/melted material of a discharge electrode that is generated by discharge energy based on in-liquid discharge between the discharge electrode and a workpiece, thereby forming a coat of the material of the electrode on the surface is already known (see Japanese Patent Application Laid-Open Application Nos. HEI 6-182626, HEI 9-19829, or HEI 9-192937).

In the conventional surface treatment method using electric discharge, a hard coat of metal carbide or the like is formed on a surface to be treated, exclusively in order to obtain abrasion resistance.

In general, a friction surface or a sliding surface is lubricated by fluid lubrication using a liquid lubricant such as a lubricating oil or grease.

However, in vacuum atmosphere such as a semiconductor production line or outer space, a liquid lubricant evaporates so that it cannot be used. In a high-temperature environment, such as an iron manufacturing line, a liquid lubricant also evaporates so that it cannot be used. Thus, there are many environments in which a lubricating oil cannot be used.

Particularly in a semiconductor production line, an oily lubricant present on a sliding surface causes a serious trouble in a semiconductor production process. Therefore, fluid lubrication using an oily lubricant cannot be applied thereto.

In the light of this matter, a sliding surface is coated by using a binder of a coat of a solid lubricant having self-lubricity, for example, a dicalcogen compound such as $MOS_2$ or $WS_2$, the so-called solid lubricant film, or by ion plating.

However, the solid lubricant film resulting from the coating method in the prior art has a drawback that the film has a restrictive life span. The ion plating has drawbacks that the device for it becomes large-sized and the size of a workpiece that can be processed is restrictive.

The present invention has been made to solve the above-mentioned problems. An object of the invention is to provide a surface treatment method making it possible to form a satisfactory and long-lived solid lubricant film on a sliding surface of a linear guide rail or the like surface without use of a large-sized device or limitation of the size of a workpiece; and a discharge electrode used in this surface treatment method.

DISCLOSURE OF THE INVENTION

The present invention provides a surface treatment method comprising the steps of using a discharge electrode comprising a material having solid lubricant effect to generate discharge in a pulse form between the discharge electrode and a workpiece, the surface of which is to be treated, in working liquid containing no carbon components, and adhering and depositing an electrode consumed/melted material of the discharge electrode that is generated by discharge energy based on the pulse form discharge onto a surface to be treated of the workpiece so as to form a coat having lubricant effect on the above-mentioned surface.

According to the above-mentioned method, the electrode material of the discharge electrode involving solid lubricant effect adheres and deposits, as the material having solid lubricant effect is, onto the surface to be treated without a change into a compound with carbon or the like, so that a coat having lubricity, that is, a solid lubricant film on the surface can be satisfactorily formed.

This solid lubricant film, which is different from films used in ion plating and so on, does not generate a distinct boundary which is present between the film and the base material and is a characteristic of surface treatment method using electric discharge. Inclination material property is exhibited between the film and the base material so that the film becomes a film that has strong adhesion power to the base material.

The pulse form discharge in the working liquid is performed by jetting the working liquid between the discharge electrode and the workpiece through nozzles, besides discharging electricity in a working bath in which the working liquid is stored.

The present invention also provides a surface treatment method using electric discharge wherein as the material having solid lubricant effect, there is used molybdenum, molybdenum disulfide, boron nitride, tungsten disulfide, carbon, silver, gold, lead, tin, indium, nickel, or turcite, which is a compound of carbon and fluorine.

According to the above-mentioned method, the electrode material of the discharge electrode comprising molybdenum, molybdenum disulfide, boron nitride, tungsten disulfide, carbon, silver, gold, lead, tin, indium, nickel, or turcite, which is a compound of carbon and fluorine adheres and deposits onto the surface to be treated so as to make it possible to form, on the surface to be treated, a lubricant coat (solid lubricant film) comprising molybdenum, molybdenum disulfide, boron nitride, tungsten disulfide, carbon, silver, gold, lead, tin, indium, nickel, or turcite, which is a compound of carbon and fluorine.

The present invention also provides a surface treatment method using electric discharge wherein water is used as the working liquid containing no carbon components.

According to the above-mentioned method, since water is used as the working liquid, the electrode material having solid lubricant effect adheres and deposits, as the material having solid lubricant effect is, onto the surface to be treated, without conversion of the electrode material to a compound with carbon or the like. As a result, a lubricant coat (solid lubricant film) can be formed on the surface to be treated.

The present invention also provides a discharge electrode used for carrying out a surface treatment method using electric discharge in a working liquid containing no carbon components, wherein the electrode is a powder compressed electrode obtained by compression-molding powder of molybdenum, molybdenum disulfide, boron nitride, tungsten disulfide, carbon, silver, gold, lead, tin, indium, nickel or turcite, which is a compound of carbon and flourine, or a metal electrode comprising one or more of these components.

According to the above-mentioned electrode, the electrode is formed with material like molybdenum, molybdenum disulfide, boron nitride, tungsten disulfide, carbon, silver, gold, lead, tin, indium, nickel, or turcite, which is a compound of carbon and fluorine adheres and deposits onto the surface to be treated so as to make it possible to form a lubricant coat (solid lubricant film) comprising molybdenum, molybdenum disulfide, boron nitride, tungsten disulfide, carbon, silver, gold, lead, tin, indium, nickel, or turcite, which is a compound of carbon and fluorine on the surface to be treated.

BEST MODE FOR CARRYING OUT THE INVENTION

Referring to the attached drawings, preferred embodiments according to the present invention will be described.

Figure 1:
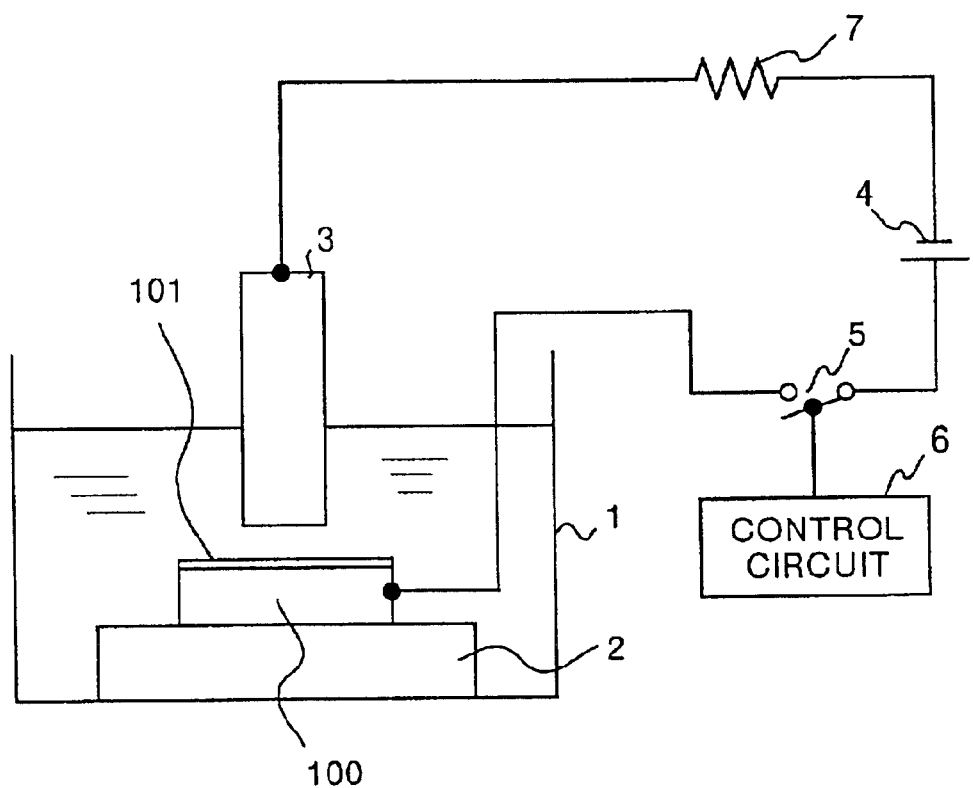
FIG. 1 is a block diagram of a discharge working machine used for carrying out the surface treatment method using electric discharge according to the present invention.

In FIG. 1, legend 1 denotes a working bath in which working liquid is collected, and legend 2 denotes a work stand which is arranged inside the working bath 1 and on which a work 100 is put. The work 100 is a workpiece whose surface is to be treated (or worked, or machined) Furthermore legend 3 denotes a discharge electrode, and legend 4 denotes a power source for applying a discharge voltage between the discharge electrode 3 and the work 100. Furthermore, legend 5 denotes a switch for switching the discharge voltage and current applied between the powder compressed electrode 3 and the work W, legend 6 denotes a control circuit for controlling on/off states of the switch 5, and legend 7 denotes a resistor.

In the surface treatment method using electric discharge according to the present invention, as the discharge electrode 3, there is used a powder compressed electrode wherein Mo (molybdenum) powder is compression-molded, or a Ti-based electrode containing Mo powder. As working liquid, tap water, treated water or pure water that contains no carbon component is used.

In the working liquid, a gap between the discharge electrode 3 and work 100, that is, a discharge gap is controlled to an appropriate gap (10 μm to several ten μm) by a well-known and non-illustrated position control mechanism that an ordinary discharge working machine has, and then a discharge voltage is intermittently applied between the discharge electrode 3 and the work 100. In this way, discharge in a pulse form is generated between the discharge electrode 3 and the work 100 in water.

As a result, the discharge electrode 3 is consumed by the energy of this discharge. An electrode consumed/melted material of the discharge electrode 3 adheres and deposits onto the surface to be treated of the work 100 so that a solid lubricant film 101 having solid lubricant effect by molybdenum is formed on the surface to be treated.

In the case that a Mo powder compressed electrode is used to form a coat onto a steel material, the boundary between the coat and the base material (steel material) is hardly found, and the formed molybdenum coat has very strong adhesion power. In such a way, it is possible to obtain a solid lubricant film that has a long life span.

Any molybdenum coat has self-lubricity as a solid lubricant and can be applied to mechanical parts used in a vacuum device or outer space.

Examples of the above-mentioned material having self-lubricity (solid lubricant material) include silver Ag, gold Au, lead Pb, tin Sn, indium In, soft metals such as nickel Ni, molybdenum disulfide $MoS_2$, boron nitride BN, tungsten disulfide $WS_2$, layered crystal materials known as solid lubricants, turcite, which is a compound of carbon and fluorine (perfluoropolyether (PFPE) resin). Even if a powder compressed electrode or a metal electrode comprising one or more of molybdenum, a solid lubricant film having lubricant effect and a long life span can be formed on the surface to be treated of a workpiece.

In general, a lubricant such as a lubricating oil or grease is used for lubrication. However, there are many environments in which a lubricant cannot be used. For example, in vacuum atmosphere such as a semiconductor production line, a lubricant evaporates so that it cannot be used. In a high-temperature environment, such as an iron manufacturing line, a lubricant also evaporates so that it cannot be used.

In vacuum atmosphere such as a semiconductor production line or outer space, and in a high-temperature environment such as an iron manufacturing line, a liquid lubricant evaporates in the process of use thereof. Therefore, it is significant that onto mechanical parts used in an environment wherein a liquid lubricant cannot be used, a coat having the above-mentioned self-lubricity and strong adhesion power to the base material (solid lubricant film) is formed by a simple device corresponding to an electric discharge working machine.

Figure 2:
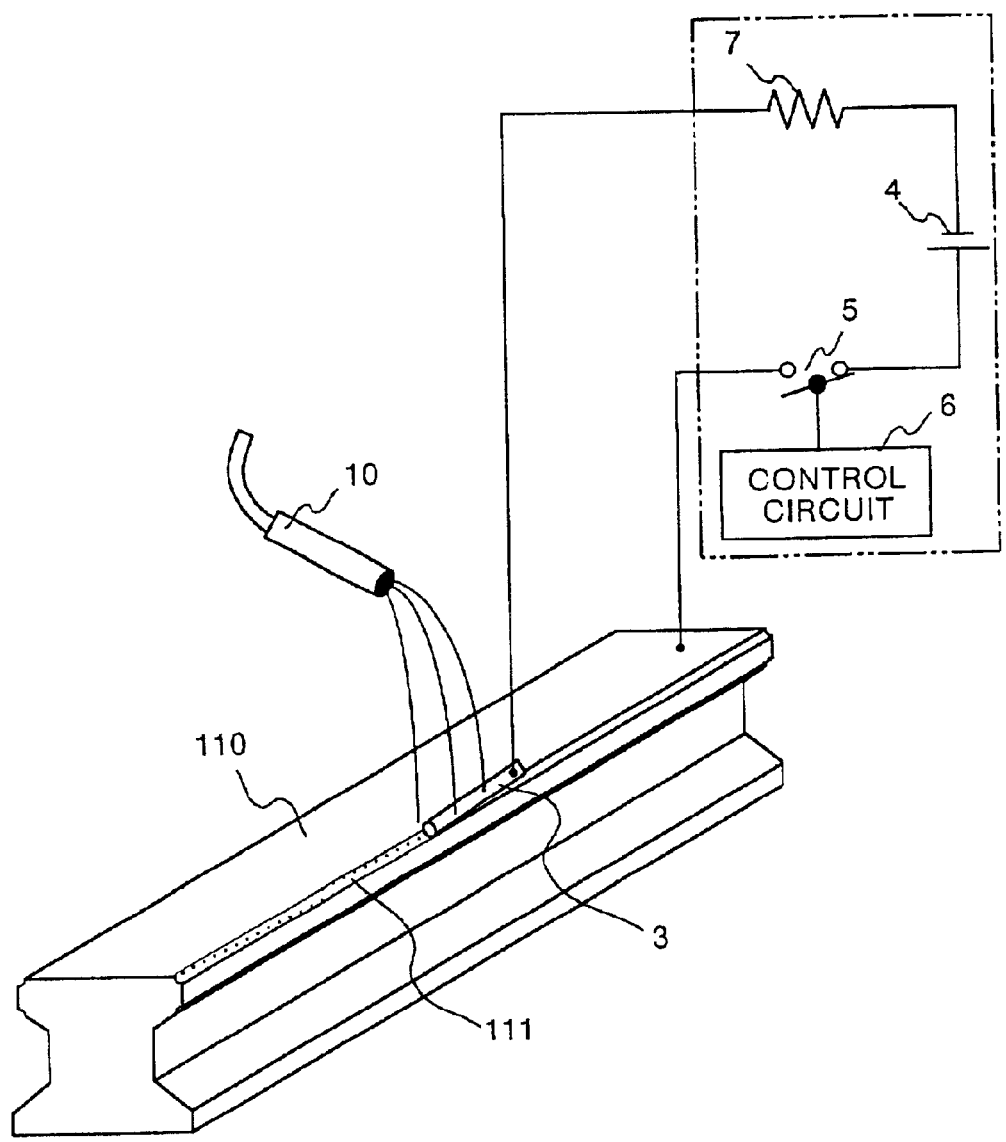
FIG. 2 is a perspective view showing an embodiment in the case that the surface treatment method using electric discharge according to the present invention is applied to a linear guide rail.

When the work is a long product such as a liner guide rail, in-liquid discharge similar to the in-liquid discharge in the working bath can be performed by spraying water, which is the working liquid, from a nozzle 10 to a discharge gap between the discharge electrode 3 and the linear guide rail 110, as shown in FIG. 2. In FIG. 2, to parts corresponding to those in FIG. 1 are attached the same reference numbers as attached in FIG. 1, and explanation of the parts is omitted.

In this case, the gap between the discharge electrode 3 and the linear guide rail 110, which is a work, that is, the discharge gap is controlled to an appropriate gap (10 μm to several ten μm). While water, which is the working liquid, is sprayed from the nozzle 10 thereto, a discharge voltage is intermittently applied between the discharge electrode 3 and the linear guide rail 110. In this way, discharge in a pulse form is generated between the discharge electrode 3 and the work 110 in water.

As a result, the discharge electrode 3 is consumed by discharge energy. An electrode consumed/melted material of the discharge electrode 3 adheres and deposits onto the surface to be treated of the linear guide rail 110 to form a self-lubricity coat having lubricant effect, for example, molybdenum, that is, a solid lubricant film 111 on the surface to be treated. In this way, it is possible to obtain a linear guide that can be used even in vacuum atmosphere or in a high-temperature environment and has self-lubricity.

Industrial Applicability

As described above, the surface treatment method using electric discharge according to the present invention makes it possible to give effectively solid lubricant effect to a member, for which a liquid lubricant cannot be used since the member is used in vacuum atmosphere or in a high-temperature environment, by a self-lubricant coat. The present process can be used in mechanical parts used in vacuum atmosphere or in a high-temperature environment.

What is claimed is:

1. A discharge surface treatment method, the method comprising the steps of:

generating an electric discharge, in a pulse form, between an electrode and a workpiece in a working liquid containing no carbon components, the electrode being formed with a material having a solid lubricant effect; and adhering and depositing the material of the electrode consumed or melted due to the generated electric discharge onto a surface of the workpiece thereby forming a coat having lubricant effect on the surface of the workpiece, wherein the material having solid lubricant effect comprises at least one of molybdenum disulfide, boron nitride, tungsten disulfide, gold, indium, and a perfluoropolyether (PFPE) resin.

2. The surface treatment method using electric discharge according to claim 1, wherein the working liquid containing no carbon components is water.

3. An electric discharge apparatus comprising:

an electrode for discharge surface treatment of a workpiece; and a working liquid in which electric discharge between said electrode and said workpiece is carried out, said working liquid containing no carbon components, and the electrode comprising a powder compressed electrode obtained by compression-molding powder of at least one of molybdenum disulfide, boron nitride, tungsten disulfide, gold, indium, and a perfluoropolyether (PFPE) resin.

* * * * *